United States Patent Office 3,708,575
Patented Jan. 2, 1973

---

3,708,575
METHOD FOR THE TREATMENT OF ATHEROSCLEROSIS EMPLOYING GLUCURONOGLYCOSAMINOGLYCAN-HYALURONATE-LYASE
Siegfried Gottfried, Ilford, England, assignor to Biorex Laboratories Limited, London, England
No Drawing. Continuation-in-part of application Ser. No. 756,314, Aug. 29, 1968. This application May 13, 1970, Ser. No. 37,016
Int. Cl. A61k 19/00
U.S. Cl. 424—94      4 Claims

ABSTRACT OF THE DISCLOSURE

The present invention is concerned with a method for the treatment of cardiac, arrythmias, thrombi, atherosclerosis, cerebral infarcts, cerebral thromboses, coronary thromboses and cardiac infarcts, by the intravenous, intraarterial or intrathecal injection of glucuronoglycosaminoglycan-hyaluronate-lyase.

---

This application is a continuation-in-part of Ser. No. 756,314, filed Aug. 29, 1968, now abandoned.

BACKGROUND OF THE INVENTION

Atherosclerosis is believed to be a lesion of large and medium-sized arteries with deposits in the intima of yellowish plaques containing lipid material.

As is known, with increasing age, most people have an impairment of the vascular system due to atheroschlerotic changes in the blood vessels, causing atheromatous obstructions which alter the physiopathological response or the local reparative reaction of the tunica intima to the diminished lateral pressure or suction of the effect generated by the hydraulic force inherent in flowing blood.

Glucuronoglycosaminoglycan-hyaluronate-lyase (hereinafter called GL) is an enzyme which is found in many tissues and organisms and which catalyses the hydrolysis of hyaluronic acid, a major component of the intercellular ground substance. Furthermore, GL has an enzyme esterase activity and is capable of breaking acetate indoxyl bonds and can also potentiate the proteolytic enzymes.

From experimental data in animal trials, we have found that GL, when administered intravenously, has a stripping action on artificially induced atheromatous lesions within blood vessels.

SUMMARY OF THE INVENTION

We have now found, as a result of investigations on human patients suffering from advanced atherosclerosis and cerebral thrombosis, as well as coronary thrombosis and infarcts and cardiac arrythmias, that the intravenous, intraarterial or intrathecal injection of at least about 20,000 IU of GL, usually of about 20,000 to 1,000,000 IU of GL, the amount injected depending upon the severity and nature of the condition, resulted in the inner layer of the vessels being stripped of sedimentations, such as atheromas, embolisms, blood clots and the like, thus clearing the blood vessels of sedimentation, possibly increasing the permeability of the vascular walls and the surrounding connective tissues, spreading or digesting the clots and thus promoting a normal and unimpaired blood circulation. As one of the early effects, we have observed that within one hour of the intravenous injection, there commences the regaining of movement lost by paresis, this probably being due to the removal of pressure by clots on the nerve endings and surrounding tissue.

DETAILED DESCRIPTION OF THE INVENTION

The effect of the GL injections into human beings is not only the removal of actual debris from the blood vessels; we have also found that, as indicated above, they have significant effects on circulatory diseases, such as myocardial infarction, atherosclorosis, coronary infarct, cardiac arrythmias and many other similar conditions.

In addition to the above-mentioned effects on the actual walls of the vessels and the regaining of elasticity, thereby diminishing sedimentation, avoiding obstructions and increasing permeability, GL also has the effect, after intravenous injection, of causing regression of S–T segment elevation in both myocardial infarction and coronary infarction, as well as in cerebral thrombosis. Clots are dislodged, spread away and broken down into manageable particles for resolution and elimination and the electrocardiogram shews, in patients treated with GL, that it diminishes the S–T displacement and other electrocardiographic phenomena, the speed of action being dependent upon the dosage administered, as well as upon how soon it was administered after the cerebral or coronary infarct or thrombosis. The improvement can be observed not only electrocardiographically but also clinically and by angiography and the patient can regain some movement after paresis.

The administration of GL to human beings in large doses by intravenous or interarterial routes, as well as intrathecally, can be used preventively in cases of atherosclerosis, thus giving a new lease of life to patients suffering from this condition. The stripping of the arteries and blood vessels to the tunica intima of obstructions which have impaired the blood circulation and probably also the effect of GL on the perivascular tissue layers, improves the permeability of the vascular walls and of the perivascular tissue layers, thus producing a great improvement in the patient. It is likely that haematomas caused by extravasation are diffused or absorbed by GL and removal thereof enables the nervous pathways to recommence functioning and reduces the blood-brain barrier. The systemic administration of GL not only makes the blood vessels more elastic but is likely to increase the permeability thereof and it also removes cholesterol and other plaques which may also be of importance in patients suffering from kidney disease.

The injections of GL can be repeated from time to time, even several times daily, depending upon the patients' condition.

The GL preparations to be used according to the present invention are administered in the form of isotonic sterile aqueous solutions preferably containing at least 20,000 IU of GL/ml., such solutions advantageously being made up from lyophilised material, which has preferably been stabilised with, for example, sodium acetate, with the addition of sodium chloride, or with sodium glutamate, polyvinyl pyrrolidone, gelatine or certain gelatine derivatives, such as methyl gelatine.

A suitable method for the preparation of GL for use in connection with the present invention is described in our British patent specification No. 1,060,513. This process prepares GL from, for example, testes, preferably mature ox testes which have been taken from freshly slaughtered animals and kept at a low temperature, preferably below 0° C., all the steps of the said method preferably being carried out at a temperature of about 2° C. In the said process, decapsulated and diced ox testes are macerated with an aqueous solution of acetic acid containing a minor amount of hydrochloric acid, preferably 2.5–10% by volume of 2 N hydrochloric acid, the macerated material centrifuged, the supernatant liquid mixed with solid ammonium sulphate, again centrifuged, the supernatant liquid again mixed with solid ammonium sulphate, centrifuged once more, the precipitated material so obtained dissolved in a minimum amount of water, this aqueous solution subjected to ultrafiltration until the volume outside the membrane of the ultrafilter is approximately one tenth of the original volume, this solution then dialysed against water, preferably distilled water, to remove contaminating ammonium sulphate and the dialysed solution lyophilised or used directly for further working up.

The lyophilised powder is then dissolved in water, mixed with chloroform, the aqueous layer separated, any fine precipitate present removed by centrifuging, the supernatant liquid dialysed against water to remove residual chloroform, the pH of the dialysate adjusted to about 2.3, left for a short time, for example, 1–15 minutes, and the pH then adjusted to about 4.8, any fine precipitate formed removed by centrifuging, ammonium sulphate added to the supernatant liquid, precipitated material removed by centrifuging, more ammonium sulphate added to the supernatant liquid, precipitated material again removed by centrifuging, this material then dissolved in water and dialysed against an isotonic solution of sodium chloride and the dialysed material lyophilised, if desired.

An aqueous solution of the lyophilised material is then chromatographed through a column of suitable ion-exchange material, such as "Amberlite" IRC–50, using a suitable buffer, such as a potassium chloride-hydrochloric acid buffer with a pH of about 1.5, as eluant, the pH of the eluate, which contains the desired GL, adjusted to about 6.0 and the volume thereof reduced by ultrafiltration, the solution outside the membrane of the ultrafilter being lyophilised. The material so obtained has a GL activity of 21,500–22,000 IU/mg. of dry material and is essentially free from the usual contaminants of hyaluronidase preparations. Further purification, if desired, can be carried out by electrophoresis on vertical starch gels at a pH of about 8.4. Acrylamide gel electrophoresis or gel filtration using a chromatographic column of CM-Sephadex–C50 can also be used for this further purification.

Attempts were made to estimate the molecular weight of GL using gel chromatography on Sephadex G–100 by Andrews' method (see P. Andrews, Biochem. J., 91,222/1964). When using dilute solutions of GL, there was obtained a major peak corresponding to a molecular weight of about 70,000 and a minor peak corresponding to a molecular weight of about 120,000, whereas, when using concentrated solutions of GL, the major peak corresponded to a molecular weight of about 120,000. This probably means that in concentrated solution GL tends to form a dimer.

The strength of the GL in IU was determined by the international standard essay procedure accepted by the World Health Organisation (see J. H. Humphrey, Bull. W.H.O., 16, 291/1957) for the essay of hyaluronidase (see also U.S. Pharmacopeia, 15th revision, p. 329/1955), but replacing the 0.1 M phosphate buffer—0.15 M NaCl, pH 7.0 by 0.1 M sodium acetate—0.15 M NaCl, pH 6.0 buffer and using ox serum instead of human serum, all the other conditions being the same. The reference hyaluronidase standard was supplied by the World Health Organisation, Division of Biological Standards, National Institute of Medical Research, Mill Hill, London, NW. 7, England.

Furthermore, it is to be understood that the GL preparations used according to the present invention are immunochemically pure and sterile and substantially free of bovine protein, pyrogenic materials and antigenic components.

The GL preparations to be used according to the present invention for the treatment of circulatory diseases in humans can be prepared as follows:

EXAMPLE

A solution of GL is prepared by dissolving the lyophilised enzyme in a sterile, isotonic saline solution in an amount to give a concentration of the enzyme of 10,000 IU per ml.

Any other desired concentration can be similarly prepared.

I claim:

1. A method for the treatment of cardiac arrythmias, thrombi, atherosclerosis, cerebral infarcts, cerebral thromboses, coronary thromboses and cardiac infarcts in human beings, comprising administering an effective amount of an isotonic, sterile solution of glucuronoglycosaminoglycan hyaluronate lyase by intravenous, intra-arterial or intrathecal injection into a human being in need of said treatment.

2. Method according to claim 1, wherein the lyase solution contains from 20,000 to 1,000,000 IU/ml.

3. Method according to claim 1, wherein the lyase is administered by injection in an amount of from 20,000 to 1,000,000 IU per injection.

4. Method according to claim 1, wherein the lyase solution is prepared by dissolving lyophilised lyase in sterile normal saline.

References Cited

FOREIGN PATENTS 1,060,513   3/1967   Great Britain _____ 424—94

OTHER REFERENCES

Chemical Abstracts 72:103744m (1970).

JEROME D. GOLDBERG, Primary Examiner
V. D. TURNER, Assistant Examiner

U.S. Cl. X.R.

260—209 R